May 4, 1937.   A. B. KOKOTIAK   2,079,323
WORK HOLDER FOR MACHINING OPERATIONS
Filed Oct. 24, 1934   2 Sheets-Sheet 1
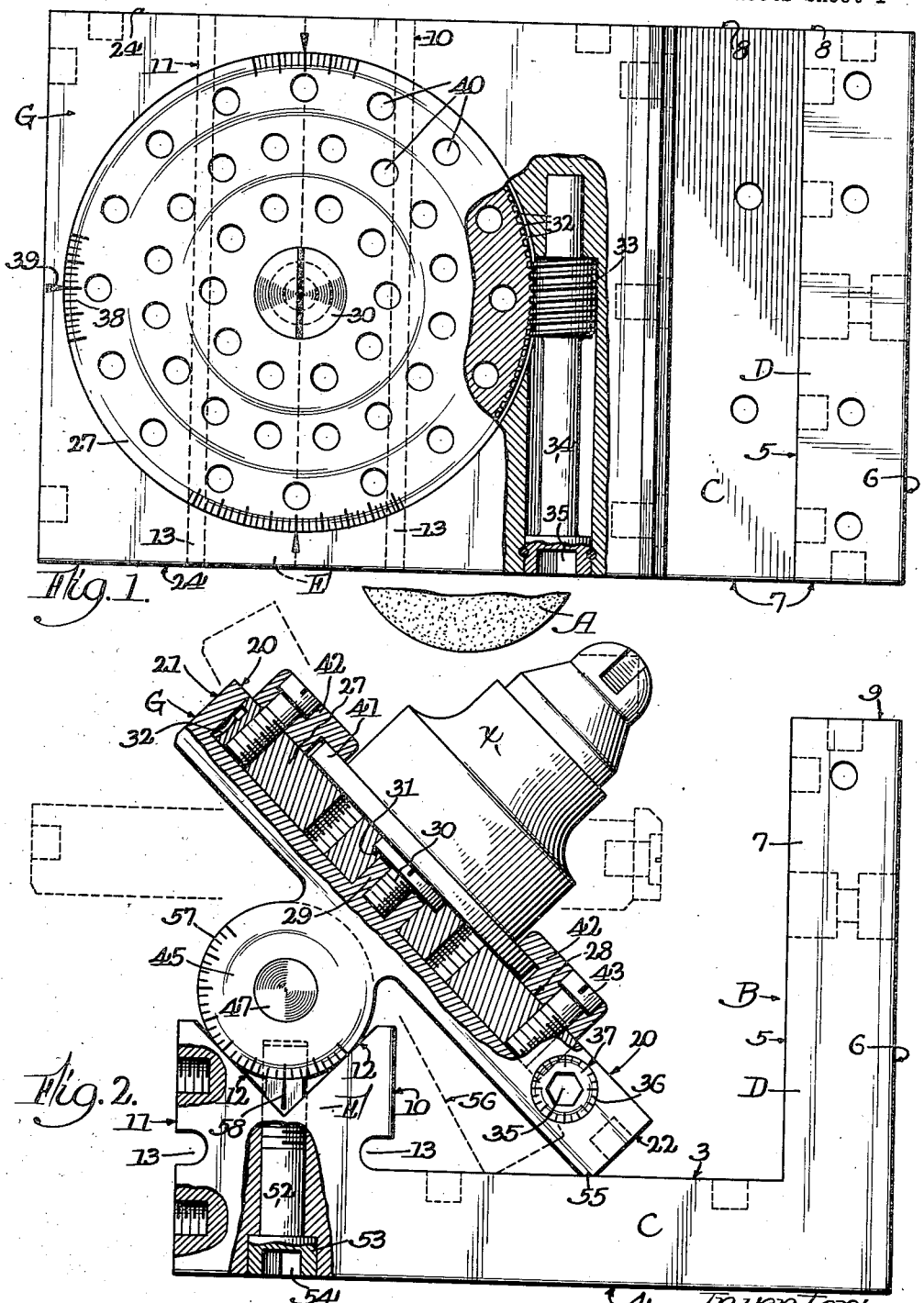

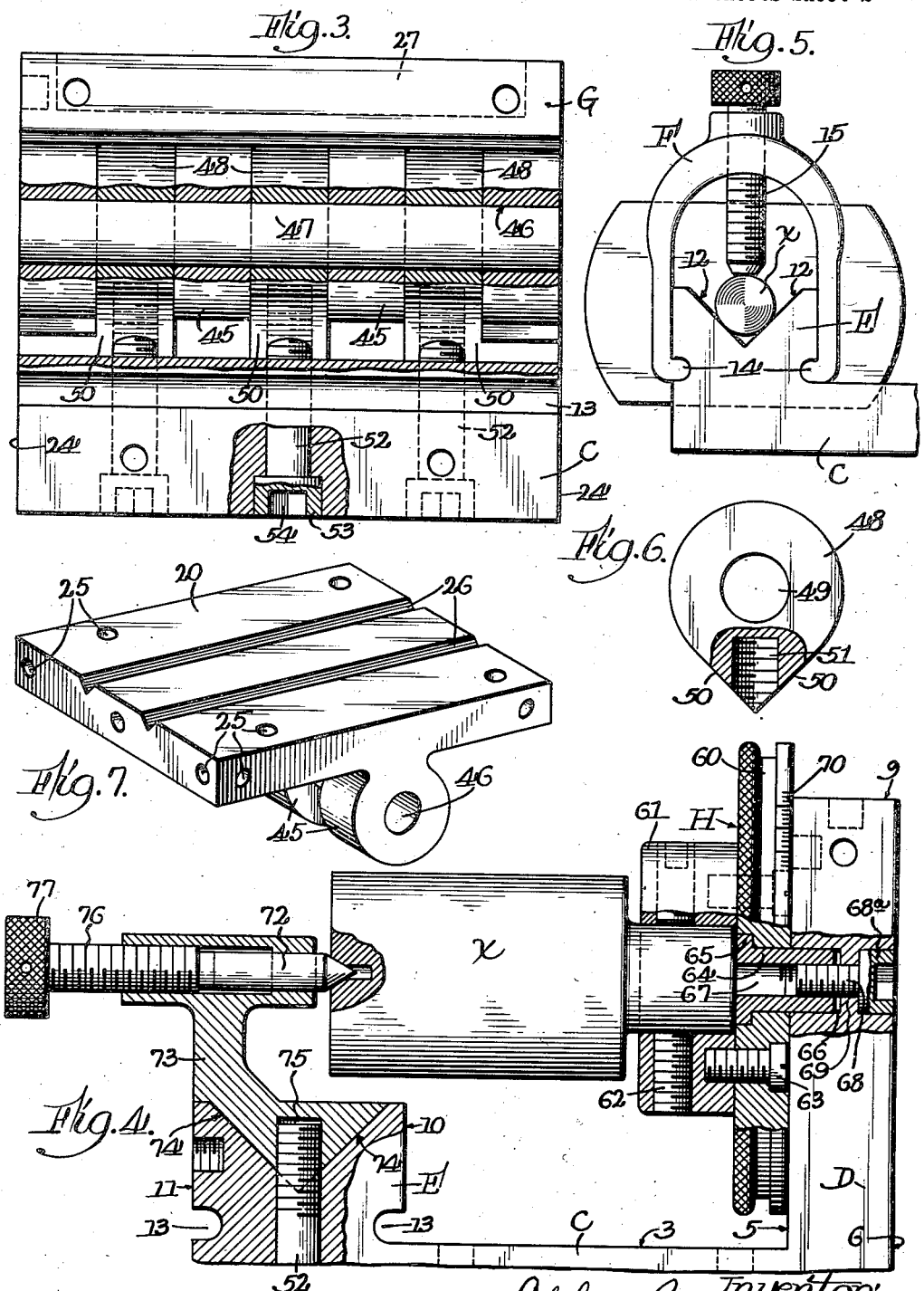

Patented May 4, 1937

2,079,323

UNITED STATES PATENT OFFICE 2,079,323

WORK HOLDER FOR MACHINING OPERATIONS

Aleksa B. Kokotiak, Chicago, Ill.

Application October 24, 1934, Serial No. 749,793

8 Claims. (Cl. 90—59)

My invention relates to an improved work holder for various machining operations such as grinding, drilling, and the like.

One of the objects of my invention is to provide a work holder device which is universal in its adaptability to hold the work to be operated upon—either regular or irregular shaped pieces of work—in accurate position and in any desired angular relation to the grinding wheel, drill or other machining tool by which the machining operation is to be performed upon the work.

Another object of my invention is to provide a work-holding device in which the faces, angles and axes of the parts bear a definite predetermined relation to each other, such that when the work to be machined is mounted on the device, the device will present the work to the machine tool at exactly the desired angle or position.

A further object is to provide a work-holding device of this character in which the parts are interchangeably related and bear definite predetermined angular relation to each other so that when assembled they accurately determine the angle or position of the work without the necessity, on the part of the operator, of measuring the position of the work, or shimming or blocking the work to the proper position.

Other objects of the invention will appear hereinafter.

Referring to the accompanying drawings which illustrate one embodiment of my invention, Fig. 1 is a top plan view of the device, with an angle plate having a rotary adjustable member upon which the work is mounted and by which it can be accurately positioned, part of the view being shown in section to illustrate the means for adjusting the rotary member;

Fig. 2 is a view in side elevation of the structure shown in Fig. 1, illustrating the angle plate in several positions and with a piece of work mounted thereon, the view being partly in section to better illustrate the construction;

Fig. 3 is an end view, partly in section, of the structures shown in Figs. 1 and 2, with the angle plate positioned horizontally and part of the structure sectioned to illustrate the means for holding the angle plate in its adjusted position;

Fig. 4 is a side elevation similar to Fig. 2, but illustrating, partly in section, attachments for holding work between centers;

Fig. 5 is a detailed view of the V-block portion of the device, illustrating the use of a machinist's U-clamp for securing the work in the block;

Fig. 6 is a detail of one of the holding rings for securing the angle plate in its adjusted position in the V-block; and Fig. 7 is a modified form of angle plate.

As before stated, my improved work holder is intended to be used in connection with various machines for performing machining operations upon the work. For the purposes of illustration, such machines are represented by a portion of a grinding wheel A which needs no further description since my invention is not concerned with the machines as such.

Machines of this character are generally provided with a flat work table or plate which is generally horizontal and vertically, laterally and longitudinally adjustable so as to move the work into operating relation to the machining member; and while this work table is not illustrated, it is to be understood that the work holder of my invention is adapted to be placed upon and supported by such work table.

The main or foundation member B of the device is in general L-shaped and comprises generally what may be referred to as a horizontal leg C and a vertical leg D formed integrally with each other. These legs are rectangular in shape and of substantial width and thickness, and they are positioned at right angles with respect to each other. The faces of these members are preferably all machined perfectly flat and bear a normal angular relation to each other. For instance, the inner face 3 of the horizontal leg C is parallel to the outer face 4, and the inner face 5 of the vertical leg D is parallel to the outer face 6 thereof. The faces 3 and 4 are preferably exactly at right angles to the faces 5 and 6. In like manner, the side edge faces 7 and 8 of both horizontal and vertical legs are in parallel relation to each other and exactly at right angles to the planes of the inner and outer faces. The end face 9 of the vertical member is parallel with the inner and outer faces of the horizontal leg and at right angles to the inner and outer and side edge faces of the vertical leg.

At the opposite end, the horizontal leg has an upstanding block E in the nature of a V-block. This block has its side edge faces in the planes of the side edge faces 7 and 8 of the member B, and an inner vertical face 10 at right angles to the faces 3 and 4 of the horizontal leg and parallel to the faces 5 and 6 of the vertical leg. The outer end face 11 of the block is in the plane and forms a continuation of the end face of the horizontal leg C, and is parallel to the vertical leg faces and at right angles to the horizontal leg faces.

The L-shaped member B is constructed in this manner and with its faces in the relations indicated, so that the member B may be placed on the work table on either of its outer faces or its side edge faces, and the operator knows, without measurement or shimming, that vertical faces will bear a definite right angle relation to the horizontal. The V-block portion E has a V-shaped channel or groove in its upper side, and the faces 12 of this groove are preferably flat and exactly at right angles to each other, and they are disposed so that they are exactly in a 45° angular relation to the inner and outer faces of both horizontal and vertical legs. This V-block portion E has grooves 13 in its opposite faces 10 and 11, so that U-clamps F, such as illustrated in Fig. 5, may be used in the usual manner for clamping the work X in the V-channel of the block. These U-clamps F are of well-known construction used in association with the ordinary V-block. They have inturned hooks or lugs 14 at the ends of their legs, adapted to enter the ends of and interlock with the grooves 13 so that the screw 15 carried by the clamp may be screwed down against the work-piece X to clamp the work-piece in the V-block.

I provide an angle plate support G which is detachably and adjustably mounted on the V-block and which is adapted as a support for the work X. This angle plate G is preferably rectangular in shape, so that its top face 20 and its end faces 21 and 22 and its side faces 24 are all perfectly flat and arranged in exact right-angle relation to each other. It is preferably exactly the same width as the L-shaped foundation member B and, when mounted in position, its side faces 24 lie in the same planes as the side edge faces of the member B. This angle plate may have a simply flat solid top surface upon which the work can be supported, as shown in Fig. 7, and this surface may be provided with a series of holes 25 which can be threaded for the purpose of holding pins or bolts of clamps to secure the work upon the plate. The plate may also have several parallel V-shaped grooves 26 which are adapted more especially for holding small diametered round pieces of work, such as rod tubing and the like. Preferably, however, the angle plate is provided with a rotatably adjustable platen 27 to which the work-piece X may be clamped or fastened, so that the work can be adjusted accurately with respect to the machining tool, as shown more clearly in Figs. 1 and 2. The platen 27 is in the form of a circular disc positioned in a correspondingly circular depression or socket in the top face of the angle plate. It is arranged so that its top surface 28 is flat and lies in the plane of the top face 20 of the angle plate. The center of the socket has an upstanding boss 29 which is threaded to receive a bolt 30 having a large flat head which is of larger diameter than the boss and is arranged to bear against shoulder 31 formed by a depression in the surface of the platen, for the purpose of holding the platen in position and at the same time permitting its rotation.

The periphery of the platen is provided with worm gear teeth 32 which are engaged by a worm 33 on a shaft 34 set in suitable bearings within the body of the angle plate. The end of the shaft 34 is enlarged to form a head which extends to a point flush with the edge face 24 of the angle plate and is provided with a hexagonal socket 35 to accommodate a suitable wrench for turning the shaft. As shown more clearly in Fig. 2, the end face of the shaft is provided with graduations 36 which cooperate with a fixed mark 37 on the face 24 of the angle plate. The marginal portion of the platen face is likewise provided with graduations 38 cooperating with a fixed mark 39 on the face 20 of the angle plate. This construction provides a micrometer adjustment for the platen whereby the work mounted thereon can be very accurately positioned with respect to the machining tool, this position being accurately determined without preliminary calculation.

The top face 28 of the platen is provided with a plurality of annular series of holes 40 concentrically arranged. The holes are preferably threaded for clamping bolts or clamps of any suitable kind by which the work X may be fastened to the plate. In Fig. 2, the work is illustrated as an irregularly shaped piece having a flange 41, and several clamps 42 are illustrated as engaging this flange to hold the work-piece in place. These clamps may be regarded as typical of any clamp for the purpose. They consist of small blocks having threaded bolts 43 which are screwed into the threaded holes 40 in the face of the platen.

As before mentioned, the angle plate B is adjustable on a horizontal axis which is parallel with the inner and outer faces of the horizontal leg C of the foundation member. The underside of the angle plate has a number of cylindrical lugs 45 offset therefrom, arranged in alignment and adapted to bear upon the faces 12 of the V-groove in the V-block E. These lugs are provided with central openings 46 arranged in alignment to provide for a center shaft 47 extending through all of the lugs. The lugs are spaced apart to provide for a number of clamping rings 48, such as illustrated in Figs. 3 and 6. These clamping rings are also provided with central openings 49 through which the shaft 47 extends. The clamping rings are preferably circular and of the same diameter as the cylindrical lugs 45 on the angle plate, except that portions of their periphery are tangential to provide flat surfaces 50 which are disposed exactly at right angles to each other, so that they will fit the groove in the V-block formed by the faces 12 thereof. Each ring is provided with a threaded socket 51, the axis of which is coincident with a diameter of the ring 48 intersecting the apex of the angle formed by the meeting faces 50. These sockets 51 are adapted to receive threaded bolts 52 extending upwardly through the V-block from the bottom thereof, as shown in Figs. 2 and 3. The bolts are provided with enlarged heads 53 set in corresponding sockets in the underside of the V-block and arranged with their outer ends flush with the bottom or outer face 4 of the horizontal leg C. The bolt heads have hexagonal sockets 54 so that a suitable wrench may be used to tighten the bolts. This construction provides an accurate and substantial clamping means for clamping angle plate G in any position to which it is adjusted.

When it is desired to adjust the angle plate, the bolts 52 can be rotated slightly to release the clamping strain. The angle plate may then be rotated to the desired angle and the bolts again tightened to apply the necessary clamping strain. The angle plate may be quickly and conveniently removed from its mounting by simply removing the clamping bolts 52 from engagement with the sockets in the clamping rings, whereupon the parts may be readily disassembled.

It will be noted that the angle plate is longer on one side of the axis of the shaft 47 than on the other side, and these lengths are so proportioned that when the angle plate is mounted on the V-block with its longer end toward the vertical leg D, and the corner 55 is brought into contact with the upper face 3 of the horizontal member C, the plane of the top face of the angle plate will be exactly at an angle of 45° with respect to either the horizontal or vertical, as shown in full lines in Fig. 2. Likewise, when the angle plate is mounted in the V-block with the short end toward the vertical leg D, the plane of the top face of the angle plate will be in exactly a 60° relation with the vertical leg D or a 30° relation with the horizontal leg C, as shown by the dotted line position 56 in Fig. 2. The operator thus knows that if the work is to be presented to the machining tool at these angles, he need only swing the angle plate down until its corner contacts with the horizontal leg C and the desired angle will be thereby determined without further calculation. Intermediate angles are determined by graduations 57 on the face of an outer lug 45, these graduations being adapted to cooperate with a fixed mark 58 on the corresponding face of the next adjacent ring member 48, as shown in Fig. 2.

It is often necessary that the work be held between centers so that it may be rotated with respect to the machining tool. In Fig. 4, I have illustrated means for holding the work in this manner. In this view the work X is represented as a cylindrical piece having a smaller diametered portion at one end. I provide an attachment H which can be detachably mounted on the inner side of the vertical leg D of the foundation member B. This attachment comprises a disc-shaped member 60 having on one side a flat face adapted to be placed against the inner face 5 of the vertical leg D, and having on its other side an extension 61 forming a chuck. This chuck portion has a large center opening and a number of radially disposed screws 62 by which the work can be centered in the chuck and held therein. The chuck portion or extension 61 may, as shown in the drawings, be a separate piece fastened to the disc 60 by a series of bolts 63, or, if desired, it may be formed integrally therewith.

The disc 60 has a centrally disposed bushing 64 flanged at its end 65 to form a shoulder cooperating with the bore in the disc to provide a bearing for the rotation of the disc. This bushing fits within a socket 66 in the inner face 5 of the vertical leg D and has a threaded bore 67 to receive a bolt 68 extending through the leg D from the outer face thereof. The bolt has an enlarged head 68a fitted in a corresponding socket in the outer face of the leg. The two sockets terminate short of each other to form an interior shoulder 69 against which the head of the bolt bears, so that the tightening of the screw draws the bushing 64 toward itself and clamps the disc 60 against the leg D. Thus the operator can simply release the screw slightly to permit the rotation of the disc, permitting the work to be rotated with respect to the machining tool. If desired, the screw can be tightened to clamp the disc in place after it has been adjusted to a desired position. Removal of the screw permits these parts to be readily disassembled and detached from the leg D. A portion of the periphery of the disc is knurled so that it can be conveniently rotated. The other portion of its periphery is provided with a series of graduations 70 which can be arranged to cooperate with a fixed mark on any part of the leg D, or with a height gauge placed on the machine table.

The other end of the work is supported by a tapered center pin 72 carried by a bracket 73 detachably mounted on the V-block E. This bracket has angularly disposed faces 74 corresponding to the angle of the V-block faces 12 so as to fit in the V-groove, and threaded sockets 75 are provided to receive the same bolts 52 which are used for fastening the angle plate in the V-block as previously described. The center pin 72 is threaded at 76 and provided with a knob 77 by which it may be rotated to move it lengthwise toward and from the work. The parts are so proportioned that the axis of this center pin is aligned with the axis of the chuck attachment H.

It is obvious that changes may be made in the construction, arrangement and operation of the parts without departing from the spirit of the invention, and it is to be understood that I contemplate such changes as fairly come within the scope of the appended claims.

I claim:

1. In a work holder of the class described, the combination of a supporting base member having a leg member disposed at an angle thereto at one end and also forming a supporting member and a V-block portion at its other end, said V-block portion having a V-shaped groove, an adjustable angle plate detachably mounted in said V-groove and including a plate member having a cylindrical portion on one side rotatably adjustable in said V-groove to position the plate member in various angular relations to said base and leg members, and means for clamping said cylindrical portion in its adjusted position.

2. In a work holder of the class described, the combination of a base member having a leg member disposed at an angle thereto at one end and a V-block portion at its other end, said V-block portion having a V-shaped groove, an adjustable angle plate detachably mounted in said V-groove and including a plate member having a cylindrical portion on one side rotatably positioned in said V-groove, means for clamping said cylindrical portion in position including a shaft extending through said cylindrical portion, a ring on said shaft having a threaded socket, and a bolt extending through said V-block portion and into said threaded socket.

3. In a work holder of the class described, the combination of a foundation member comprising a rectangular horizontal leg and a rectangular vertical leg disposed at right angles to the horizontal leg to provide various supporting portions for the holder, means forming a V-groove in said horizontal leg spaced from said vertical leg, a work-supporting plate rectangular in shape and having a cylindrical member on one face thereof adapted to be positioned in said V-groove and to be rotatable therein to position the plate at any desired angle with respect to said horizontal and vertical legs, and means for fastening said cylindrical member in said groove to hold the plate in any position to which it is adjusted.

4. In a work holder of the class described, the combination of a foundation member comprising a rectangular horizontal leg and a rectangular vertical leg disposed at right angles to the horizontal leg to provide various supporting portions for the holder, means forming a V-groove in said horizontal leg spaced from said vertical leg, a work-supporting plate rectangular in shape and having a cylindrical member on one face thereof adapted to be positioned in said V-groove and to be rotatable therein to position the plate at any desired angle with respect to said horizontal and vertical legs, means for fastening said cylindrical member in said groove to hold the plate in any position to which it is adjusted, a rotatable disc mounted on the other face of said plate and having means by which a piece of work may be attached thereto, and means mounted on the plate for rotating said disc to any desired adjusted position.

5. In a work holder of the class described, the combination of a foundation member including two rectangular leg portions disposed at right angles to each other to provide a plurality of supporting portions for the holder, a V-block portion at one end of one of said leg portions spaced from the other leg portion, a work-supporting plate having an offset cylindrical portion on one face thereof rotatably positioned in the V of said V-block portion for adjustment to any desired angle with respect to said leg portions, and means for securing said cylindrical member in its adjusted position.

6. In a work holder of the class described, the combination of a foundation member including two rectangular leg portions disposed at right angles to each other, a V-block portion at one end of one of said leg portions spaced from the other leg portion, a work-supporting plate having an offset cylindrical portion on one face thereof adapted to be rotatably positioned in said V-block portion for adjustment to any desired angle with respect to said leg portions, means for securing said cylindrical member in its adjusted position, said means including a shaft extending through said cylindrical portion, a plurality of rings on said shaft having V-shaped portions fitting the groove of said V-block portion, and bolts extending through said V-block portion and threaded into said rings.

7. In a work holder of the class described, the combination of a block having a V-shaped groove therein, a cylindrical member positioned for rotation in said V-groove and comprising a plurality of sections spaced apart and arranged in alignment, a shaft member extending centrally through said sections, ring-shaped members on said shaft positioned in the spaces between said sections and having threaded sockets and bolts extending through said block members and into threaded engagement with said sockets, and a plate mounted on said cylindrical portion and having means for securing the work thereto.

8. In a work holder of the class described, the combination of an L-shaped member comprising rectangular leg portions disposed at right angles to each other, a V-block portion at the outer end of one of said leg portions and spaced from the other leg portion and extending above the surface of the leg portion on which it is formed, said V-block having a V-shaped groove on its upper surface extending in parallel relation to the other leg portion, a rectangular angle plate having a cylindrical bearing portion on one face thereof and offset from the plane of said face, said bearing portion being adapted for rotation in said V-groove to position the angle plate in any desired angular relation to said leg portions, and means for fastening the bearing portion in its rotated position.

ALEKSA B. KOKOTIAK.